United States Patent Office 2,942,014
Patented June 21, 1960

2,942,014
OXIDATIVE COUPLING PROCESS

Margaret D. Cameron, Kettering, Ohio, assignor to Monsanto Chemical Company, St. Louis, Mo., a corporation of Delaware No Drawing. Filed Dec. 7, 1955, Ser. No. 551,530

19 Claims. (Cl. 260—410.6)

This invention relates to the oxidative coupling of acetylenic oxy compounds.

The oxidative coupling of acetylenic compounds, which takes place in the presence of cuprous ions and an oxidizing agent, may be illustrated by the schematic equation:

$$AC{\equiv}CH + HC{\equiv}CB \rightarrow AC{\equiv}C-C{\equiv}CB$$

where A and B are the residues of the acetylenic compounds and may be the same or different. In the coupling procedure as modified by Zalkind (J. Gen. Chem. U.S.S.R. (1931) 7, 227), and later workers, acetylenic oxy compounds such as alcohols are coupled in an aqueous solution of a cuprous halide and ammonium chloride with oxygen as the oxidizing agent.

In accordance with the present invention, acetylenic oxy compounds, i.e., acetylenic ethers, acetylenic alcohols and esters of acetylenic alcohols, which contain a free acetylenic hydrogen atom, are coupled in the presence of a cuprous halide and an amine hydrohalide.

The utility of amines in the present process is surprising, since it is known (Rose and Gale, J. Chem. Soc. 1949, 792), that amino hydrogen atoms may react with acetylenic hydrogen atoms in the presence of a copper acetylide, forming amino substituted diacetylene compounds. However, it has unexpectedly been found that the present acetylenic oxy compounds couple under these conditions without reaction with amines. Tertiary amines have also surprisingly been found useful in the present reaction, despite the known tendency of such amines to cause degradation of acetylenic compounds during coupling (Straus, Ann. (1905) 342, 190).

The present reaction goes readily and in good yields. It is particularly useful in the coupling of the more sensitive and/or refractory acetylenic oxy compounds, where yields are obtained by the present process which are substantially higher than those which can be attained with the prior ammonium chloride procedure. Thus, for example, the present reaction, as described herein below, may be particularly usefully applied to the coupling of esters of acetylenic alcohols to produce directly diesters of diacetylenic glycols, which have heretofore been prepared only by esterification of the corresponding glycol.

The amines which may be used in the present reaction include primary, secondary, and tertiary amines. Useful tertiary amines may include, e.g., tributylamine, N,N-diethylaniline, pyridine, β-picoline, quinoline, etc. Secondary amines such as diethylamine, morpholine, indole, etc., are also useful. Particularly preferred in the present process, however, are primary amines.

As examples of primary amines which may be used, in the form of their hydrohalides, in the present oxidative coupling process may be listed, e.g., alkyl amines, such as methylamine, ethylamine, n-propylamine, n-butylamine, n-amylamine, hexylamine, laurylamine, etc.; alkylene polyamines such as ethylenediamine, trimethylenediamine, diethylenetriamine, tetramethylenediamine, pentamethylenediamine and hexamethylenediamine; alkanol amines such as ethanolamine; olefin amines, such as allylamine; and aromatic amines, such as aniline. Especially useful among the primary amines for the purposes of the present invention are the tertiary alkyl primary amines such as t-butylamine, 1,1,3,3-tetramethylbutylamine, 1,1-dimethylhexylamine, etc., as well as tertiary alkyl primary amines containing alkyl chains of up to twenty-four carbon atoms, wherein the carbon atom adjacent to the amino group is free of hydrogen atoms, and mixtures thereof.

It is to be understood that the present amines may be employed in the process of the invention as the corresponding hydrohalides or as mixtures of the amine and the corresponding hydrohalide. In preparing the reaction mixture, either the amine hydrohalide may first be prepared and then used in the reaction mixture, or alternatively, the amine may be mixed with a hydrohalogen acid such as hydrochloric acid, whereby the corresponding amine hydrochloride salt is formed in situ.

Acetylenic oxy compounds which may be employed in the process of the invention include acetylenic ethers, acetylenic alcohols, and carboxylic acid esters of acetylenic alcohols, which contain a free acetylenic hydrogen, and which are free of substituents interfering with the course of the present reaction, e.g., alkali-sensitive substituents. As examples of acetylenic ethers which may be coupled by the present method may be listed, e.g., methyl propargyl ether, ethyl propargyl ether, 2-chloroethyl propargyl ether, isopropyl propargyl ether, n-butyl propargyl ether, phenyl propargyl ether, p-tolyl propargyl ether, p-bromophenyl propargyl ether, triphenylmethyl propargyl ether, 1-methyl-2-propynyl ethyl ether, 1-ethyl-2-propynyl ethyl ether, 1-phenyl-2-propynyl ethyl ether, 2-cyanoethyl 1,1-dimethyl-2-propynyl ether, 1,1-dipropyl-2-propynyl methyl ether, 1-methyl-1-phenyl-2-propynyl methyl ether, 1-methyl-1-propyl-2-propynyl methyl ether, etc.

Alcohols which may be employed in the process of the present invention include primary acetylenic alcohols containing a free acetylenic hydrogen atom, such as 2-propyn-1-ol, 3-butyn-1-ol, 4-pentyn-1-ol, 2-methyl-3-butyn-1-ol, 2-methyl-4-pentyn-1-ol, 2-ethyl-4-pentyn-1-ol, 10-undecyn-1-ol, etc., as well as primary ether alcohols such as 2-(3-butynyloxy)ethanol, etc. Presently useful secondary acetylenic carbinols include, e.g., 3-butyn-2-ol, 1-pentyn-3-ol, 1-hexyn-3-ol, 5-methyl-1-hexyn-3-ol, 1-heptyn-3-ol, 1-octyn-3-ol, 1-phenyl-2-propyn-1-ol, 1-(2-furyl)-2-propyn-1-ol, 1-nonyn-3-ol, 1-decyn-3-ol, 4-ethyl-1-octyn-3-ol, etc. Among tertiary acetylenic alcohols which may be coupled by the present process may be listed, for example, 2-methyl-3-butyn-2-ol, 3-methyl-1-pentyn-3-ol, 3-methyl-1-hexyn-3-ol, 3,4-dimethyl-1-pentyn-3-ol, 3-ethyl-1-pentyn-3-ol, 3-methyl-1-heptyn-3-ol, 3,4-dimethyl-1-hexyn-3-ol, 3,4,4-trimethyl-1-pentyn-3-ol, 1,1-diphenyl-2-propyn-1-ol, 1-ethynyl-1-cyclopentanol, 1-ethynyl-1-cyclohexanol, 2,2-dimethyl-1-ethynyl-1-cyclopentanol, etc. There may also be coupled by the process of this invention such other acetylenic alcohols which contain a free acetylenic hydrogen atom as vinylacetylenic carbinols, e.g., 2-methyl-3-hexen-5-yn-2-ol, glycols, e.g., 2-hydroxy-3-butyn-1-ol, polyhydroxy acetylenic alcohols, e.g., 2,3-dihydroxy-4-pentyn-1-ol, halogen-substituted alcohols, e.g., 1-chloro-3-butyn-2-ol, cyano-substituted alcohols, e.g., 5-hydroxy-6-heptynenitrile, etc.

The process of the invention is particularly useful for the coupling of esters of acetylenic alcohols, which as explained hereinabove, have previously been obtainable only by the esterification of diacetylenic glycols. It has now been found that the process of the invention avoids the difficulties encountered with conventional coupling procedures, that coupling conditions give rise to cleavage of the ester bond and formation of amides. Especially with the preferred catalysts of the invention, the tertiary alkyl primary amines, very good yields of esters of diacetylenic glycols are obtained in a single step from esters of acetylenic alcohols by the process of the invention.

Acetylenic esters which may be coupled by the process of the invention are carboxylic acid esters of acetylenic alcohols, which esters contain a free acetylenic hydrogen atom on the alcohol-derived portion of the ester. By the term carboxylic acid esters are here included both carboxylate esters wherein the carbon atom of the carboxylic radical is bonded to another carbon atom, and carbamate esters, wherein the carboxylic radical is connected to another organic radical through a nitrogen atom. Examples of suitable esters for coupling by the present reaction are, e.g., the acetates, propionates, butyrates, valerates, pelargonates, benzoates, 3,5-dinitrobenzoates, p-bromobenzoates, p-aminobenzoates, acid phthalates and acid 3-nitrophthalates, sorbates, carbanilates, naphthalenecarbamates, etc., of the above acetylenic alcohols. Examples of specific esters which may be coupled by the present method are alkanoates, such as propargyl acetate, 3-butynyl propionate, propargyl butyrate, propargyl valerate, propargyl pelargonate, propargyl 2 - ethylhexanoate, 1 - methyl - 2 - propynyl acetate, 1 - ethynyl - 1 - methylpentyl acetate, etc.; alkenoates, such as propargyl acrylate, propargyl sorbate, etc., and esters of aromatic acids, such as propargyl benzoate, propargyl 3,5 - dinitrobenzoate, 1,1 - dipropyl - 2-propynyl benzoate, etc.

Particularly amenable to coupling by the process of the invention are the acid esters of dicarboxylic acids. Illustrative of presently useful aromatic dicarboxylic half-esters are phthalic acid half-esters, e.g., esters with primary acetylenic alcohols, such as propargyl hydrogen phthalate, 3-butynyl hydrogen phthalate, 2-methyl-3-butynyl hydrogen phthalate, 2-chloromethyl-4- pentynyl hydrogen phthalate, and 2-ethyl-5-hexynyl hydrogen phthalate; phthalate half-esters with secondary acetylenic alcohols such as 1-methyl-2-propynyl hydrogen phthalate, 1-ethyl-2-propynyl hydrogen phthalate, 1-isopropyl-3-butynyl hydrogen phthalate, 2-ethoxy-1-ethyl-5-hexynyl hydrogen phthalate,1-(p-chlorophenyl)-2-propynyl hydrogen phthalate, and 1-ethynylbutyl hydrogen phthalate; and phthalate half-esters with tertiary acetylenic alcohols, such as 1,1-dimethyl-2-propynyl hydrogen phthalate, 1-(2-chloroethyl)-1-methyl-2-propynyl hydrogen phthalate, 1-ethynyl-1,2-dimethylpentyl hydrogen phthalate, 1-ethynyl-1-ethylhexyl hydrogen phthalate, and 1-ethynyl-1-cyclopentyl hydrogen phthalate. Another class of acetylenic alcohol esters which may be coupled by the present reaction comprises half-esters of substituted and hydrogenated phthalic acids, such as half-esters of 3-nitrophthalic acid, e.g., propargyl hydrogen 3-nitrophthalate, 1-ethyl-2-propynyl hydrogen 3-nitrophthalate, 1-phenyl-2-propynyl hydrogen 3-nitrophthalate, 1-methyl-1-propyl-2-propynyl hydrogen 3-nitrophthalate, etc.; half-esters of alkyl-substituted phthalic acid derivatives, e.g., propargyl hydrogen 4-t-butylpathalate, 3-butynyl hydrogen 4-t-butylphthalate, 2-methyl-3-butynyl hydrogen 4 - t - butylphthalate, etc.; half-esters of hydrophthalic acids, e.g., propargyl hydrogen dihydrophthalate, propargyl hydrogen tetrahydrophthalate, 1-methyl-2-propynyl hydrogen tetrahydrophthalate, 1-methyl-1-propyl - 2 - propynyl hydrogen tetrahydrophthalate, 1-ethynyl-1-methylpentyl hydrogen tetrahydrophthalate, etc.; half-esters of alkoxy-substituted phthalic acids, e.g., propargyl hydrogen 3-methoxyphthlate, 2-methyl-3-butynyl hydrogen 3-methoxyphthalate, 4-cyano-1-ethynylbutyl hydrogen 3-ethoxyphthalate, 1-ethynyl-1-methylpentyl hydrogen 3-methoxyphthalate, etc. Other dicarboxylic aromatic or cycloaliphatic half-esters useful in the present process are, e.g., propargyl hydrogen diphenate, propargyl hydrogen terephthalate, propargyl hydrogen clclohexane-1,2-dicarboxylate, etc.

Typical of presently useful half-esters of aliphatic dicarboxylic acids are, e.g., propargyl hydrogen succinate, 1-isopropyl-2-propynyl hydrogen succinate, 1-(2-furyl)-2-propynyl hydrogen succinate, propargyl hydrogen glutarate, 3-butynyl hydrogen glutarate, 1-ethynylpentyl hydrogen glutarate, propargyl hydrogen maleate, 1-methyl-2-propynyl hydrogen maleate, 1-ethynyloctyl hydrogen maleate, 1-isopropyl-1-methyl-2-propynyl hydrogen maleate, propynyl hydrogen fumarate, etc.

Esters of carbamic acids may also be used in the present reaction, e.g., carbanilates, naphthalenecarbamates, etc. Examples of such esters which may be coupled by the process of the invention are propargyl carbanilate, propargyl m-chlorocarbanilate, propargyl m-ethoxycarbanilate, propargyl 1-naphthalenecarbamate, propargyl 2-naphthalenecarbamate, 1-ethyl-2-propynyl carbanilate, 1-ethynyl-1-cyclohexyl carbanilate, etc.

The products of the present reaction are diacetylenic glycols and ethers and esters thereof. As examples of products of coupling ethers of acetylenic alcohols using the process of the invention may be listed, e.g., 1,6-dimethoxy-2,4-hexadiyne,
1,6-diethoxy-2,4-hexadiyne,
1,6-di-n-propoxy-2,4-hexadiyne,
1,6-diiso-butoxy-2,4-hexadiyne,
1,6-diphenoxy-2,4-hexadiyne,
1,6-di-p-toloxy-2,4-hexadiyne,
1,6-di-m-bromophenoxy-2,4-hexadiyne,
1,6-ditrityloxy-2,4-hexadiyne,
2,7-diethoxy-3,5-octadiyne,
3,8-diethoxy-4,6-decadiyne,
3,8-diethoxy-3-8-dimethyl-4,6-decadiyne,
2,7-dimethoxy-2,7-diphenyl-3,5-octadiyne,
1,6-bis(2-methoxyethoxy)-2,4-hexadiyne, etc.

As examples of products from the coupling of alcohols by the process of the invention may be listed, e.g., 2,4-hexadiyne-1,6-diol,
3,5-octadiyne-1,8-diol,
2,7-dimethyl-3,5-octadiyne-1,8-diol,
4,6-decadiyne-1,10-diol,
2,9-diethyl-4,6-decadiyne-1,10-diol,
3,12-dioxa-6,8-tetradecadiyne-1,14-diol,
3,5-octadiyne, 2,7-diol,
1,6-diphenyl-2,4-hexadiyne-1,6-diol,
2,11-dimethyl-5,7-dodecadiyne-4,9-diol,
2,7-dimethyl-3,5-octadiyne-2,7-diol,
3,8-diethyl-4,6-decadiyne-3,8-diol,
1,1,6,6-tetraphenyl-2,4-hexadiyne,1,6-diol,
1,8-dichloro-3,5-octadiyne-2,7-diol, etc.

Products obtainable by coupling esters of acetylenic alcohols in accordance with the process of the invention are, e.g., 2,4-hexadiyne-1,6-diol diacetate,
2,4-hexadiyne-1,6-diol dipropionate,
2,4-hexadiyne-1,6-diol dibutyrate,
2,4-hexadiyne-1,6-diol dipelargonate,
2,4-hexadiyne-1,6-diol dibenzoate,
2,4-hexadiyne-1,6-diol di(3,5-dinitrobenzoate),
2,4-hexadiyne-1,6-diol di(hydrogenmaleate),
2,4-hexadiyne-1,6-diol di(hydrogen succinate),
2,4-hexadiyne-1,6-diol di(hydrogen phthalate),
2,4-hexadiyne-1,6-diol di(hydrogen 3-nitrophthalate),
2,4-hexadiyne-1,6-diol di(hydrogen 4-t-butylphthalate),
2,4-hexadiyne-1,6-diol di(hydrogen dihydrophthalate),
2,4-hexadiyne-1,6-diol di(hydrogen tetrahydrophtalate),
2,4-hexadiyne-1,6-diol di(hydrogen 3-methoxyphthalate),
2,4-hexadiyne-1,6-diol dicarbanilate,
2,4-hexadiyne-1,6-diol di(1-naphthalenecarbamate),
1,6-diphenyl-2,4-hexadiyne-1,6-diol diacetate,
3,5-octadiyne-1,8-diol diacetate,
4,6-decadiyne-1,10-diol diacetate,
3,5-octadiyne-2,7-diol diacetate,
2,11-dimethyl-5,7-dodecadiyne-4,9-diol diacetate,
3,5-octadiyne-1,8-diol dibutyrate, 2,7-dimethyl-3,5-octadiyne-1,8-diol di(hydrogen phthalate),
4,6-decadiyne-1,10-diol di(hydrogen phthalate),
1,14-dichloro-6,8-tetradecadiyne - 4,11-diol di(hydrogen phthalate),
2,7-dimethyl-3,5-octadiyne-1,8-diol di(hydrogen 4-t-butylphthalate),
3,5-octadiyne-1,8-diol di(hydrogen tetrahydrophthalate),
3,5-octadiyne-1,8-diol di(hydrogen 3-nitrophthalate),
3,5-octadiyne-1,8-diol dicarbanilate,
3,5-octadiyne-2,7-diol di(hydrogen phthalate),
1,8-diethoxy-3,5-octadiyne-2,7-diol di(hydrogen tetrahydrophthalate),
1,1,6,6-tetraphenyl-2,4-hexadiyne-1,6-diol dibenzoate, etc.

In carrying out the process of the invention, the acetylenic oxy compound, i.e., alcohol, ester or ether, is contacted with cuprous ions and an amine salt and the reaction mixture is oxidized. Preferably, the cuprous ions are derived from a cuprous halide, e.g., a chloride or bromide, but alternatively there may be used other salts such as cuprous oxide as a source of cuprous ions. Most conveniently, amine hydrohalides are employed as the aforesaid amine salts, but it is not excluded to employ other conventional amine salts if desired. Atmospheric or cylinder oxygen is a convenient agent to produce the necessary oxidation of the reaction mixture and is the preferred oxidizing reagent in the present process; alternative methods which may be used if desired are, e.g., hydrogen peroxide, electrolysis, etc.

The overall coupling reaction may be represented by the exemplary equation $$Cu_2Cl_2 + 4\text{-amine.HCl} + 2R-C\equiv CH + \tfrac{1}{2}O_2$$
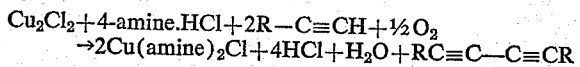

where R is the residue of the acetylenic compound. As shown by this schematic reaction equation, one mole of cuprous salt and two moles of amine hydrochloride are consumed per mole of acetylenic compound. However, as shown by a more detailed breakdown of the reactions taking place:

(1) $\tfrac{1}{2}Cu_2Cl_2 + 2\text{-amine.HCl} \rightarrow Cu(amine)_2Cl + 2HCl$
(2) $2Cu(amine)_2Cl + 2RC\equiv CH$
$\rightarrow 2Cu(amine)_2(C\equiv CR) + 2HCl$
(3) $2Cu(amine)_2(C\equiv CR) + 2\text{-amine.HCl} + \tfrac{1}{2}O_2$
$\rightarrow 2Cu(amine)_4(C\equiv CR)Cl + H_2O$
(4) $2Cu(amine)_4(C\equiv CR)Cl$
$\rightarrow 2Cu(amine)_2Cl + 4\text{ amine} + RC\equiv C-C\equiv CR$ the cuprous amine chloride complex may be regenerated during the reaction, and thus the molar ratios indicated by the schematic overall equation above are not critical. The proportions of cuprous salt, amine, and acetylenic oxy compound may, therefore, be varied as desired, for example, to utilize from 1:2 to 1:5 equivalents of cuprous salt to acetylenic compound. Smaller amounts of cuprous ion generally require longer reaction times to attain a given yield, and, therefore, it is preferred not to go much below the above ratio; an excess of cuprous salt and/or amine salt can, of course, be used if desired, but may be wasteful of reagents.

In addition to adjustment of the proportions of the reactants, the present process may also be facilitated by control of the pH of the reaction mixture. It will be seen from the above equation that acid (hydrochloric acid in this case) is generated during the reaction. The amine salt, i.e., hydrohalide, may have a pH of, for example, about three, which is on the acidic side. Preferably, therefore, to avoid the production of too strongly acidic a reaction medium, the acidity of the reaction mixture is adjusted in the present process to give a pH which is close to neutral. The pH may be either on the acidic or the basic side of neutral, and may suitably be altered in accordance with the acid or alkali sensitivity of the compound being reacted. Generally, it may be preferred to start with a basic solution. Conveniently, the pH of the reaction mixture is adjusted by addition of the amine corresponding to the amine salt used in the process. Instead of preparing the reaction mixture from a mixture of a preformed amine salt, it is also possible to start with the desired amine, adding acid, e.g., HCl, thereto, whereby the amine may be neutralized to any desired point, i.e., there is attained either a mixture of the amine and the corresponding amine hydrohalide or else all of the amine is completely converted to the corresponding salt. It is also possible to carry out the present reaction using only amine; however, this is not a preferred method.

It is an advantage of the present process that solvents and diluents are not required. In one mode of operation of the present process, the amine component of the reaction mixture may also serve as the reaction medium. Where the cuprous amine chloride complex is soluble in the acetylenic oxy compound being coupled, under the reaction conditions, a solvent may also be dispensed with. In another alternative mode of procedure uniquely afforded by the novel process of the invention, the coupling may be carried out in an organic solvent such as tetrahydrofuran, dimethyl sulfoxide, etc.; this method of operation offers the advantage of affording a reaction medium for carrying out coupling of compounds insoluble in conventional aqueous or alcoholic coupling media. It is to be understood that the present reaction is also operable in polar solvents such as water or ethanol. The amine used in the present reaction may, as explained above, be either a primary, a secondary, or a tertiary amine. Although it has been found that a tertiary amine free of amino hydrogen is operable as a component in the present reaction, it has been found that much lower yields are obtained with these amines than are attainable by the use of primary amines, which give exceptionally and unexpectedly high yields of coupled product. Especially preferred in the present process are the tertiary alkyl primary amines, which have the structure:

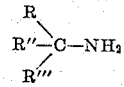

where R, R″, and R‴ are alkyl substituents. The tertiary alkyl primary amines are particularly useful in the present process for the coupling of esters of acetylenic alcohols.

Thus, a typical reaction mixture may comprise one equivalent part of cuprous chloride, two molar parts of a tertiary alkyl primary amine hydrochloride, sufficient of the corresponding alkyl amine to adjust the mixture to pH 8, and two parts of the acetylenic oxy compound, dissolved in, for example, tetrahydrofuran.

It may be noted here that two different acetylenic compounds may be coupled by the present process, giving the expected mixture of three diacetylenic glycols or their ether or ester derivatives as products. The various diacetylenic products may then be separated, e.g., by extraction or distillation. Thus, the starting reaction mixture may contain two different acetylenic oxy compounds, if desired.

In carrying out the process of the invention, the cuprous chloride, amine and amine hydrochloride, and acetylenic oxy compound are intimately contacted and exposed to an oxidizing agent such as atmospheric oxygen. The temperature of the reaction may range from below room tempearture up to below the decomposition point of the reaction components. Superatmospheric pressures may advantageously be applied to accelerate the reaction, though it has been found that the coupling may be brought to substantial completion in reasonable times at atmospheric pressure or below. Conveniently, the oxidation may be accomplished by bubbling oxygen through the reaction mixture, or by stirring the reaction mixture vigorously or shaking it beneath an oxygen atmosphere under a slight pressure, e.g., in atmospheric pressure hydrogenation apparatus. The time of reaction depends on factors such as the molar ratio of cuprous amine chloride to acetylenic compound, temperature and pressure, etc., and may vary with the acetylenic compound being coupled. On completion of the reaction, the product may be isolated, e.g., by extraction, crystallization, distillation, etc.

The invention is further illustrated, but not limited, by the following examples:

*Example 1*

This example illustrates the coupling of an acetylenic alcohol using a tertiary amine.

Air was drawn through a solution of 28 g. of propargyl alcohol, 19.8 g. of cuprous chloride, 32 g. of pyridine, and 7.3 g. of hydrochloric acid in 300 ml. of water for 50 hours. The resulting suspension of blue crystals and yellow product was extracted in the continuous liquid extractor with ether for 40 hours. Evaporation of the ether extract gave a 16% yield (4.3 g.) of 2,4-hexadiyne-1,6-diol, M. 111.5–112.5° C.

*Example 2*

This example illustrates the superior yields obtained in the present process with primary amines.

A mixture of 6 ml. (0.09 mole) of ethylenediamine, 50.6 g. (0.38 mole) of ethylenediamine dihydrochloride, 25.0 g. (0.13 mole) of cuprous chloride, and 11.5 ml. =11.2 g. (0.2 mole) of propargyl alcohol in 100 ml. of water was stirred for 20 hours under a slight positive pressure of oxygen. The resulting reaction mixture was diluted to 800 ml. with water and extracted for 30 hours with ether. There were obtained 8.9 g. of 2,4-hexadiyne-1,6-diol, which is an 81% yield.

*Example 3*

This example illustrates the use of an organic solvent as the reaction medium.

To a solution of 5.4 g. of ethylenediamine, 50.6 g. of ethylenediamine dihydrochloride and 25 g. of cuprous chloride in 200 ml. of tetrahydrofuran were added 12 ml. of propargyl alcohol. The mixture was stirred as above, under a slight oxygen pressure, overnight. The tetrahydrofuran was then removed under a low vacuum, and the residual reaction mixture washed into a continuous liquid-liquid extractor with water. The ether extract of this residue, on evaporation under low pressure, gave a crude yield of product which, after recrysallization from water, weighed 8.7 g. and melted at 111–112° C. This is a 79% yield of the 2,4-hexadiyne-1,6-diol.

*Example 4*

This example illustrates the use of a tertiary alkyl primary amine in the coupling reaction.

Hydrochloric acid was added to a reaction flask containing 98.5 ml. of t-butyl amine, with ice cooling, until the pH of the mixture was equal to ten, after which the amine hydrochloride was diluted with water to 150 ml. and the pH adjusted with hydrochloric acid to a value of pH 8. This amine hydrochloride solution was then mixed with 25 g. of cuprous chloride and 11.2 g. (0.20 mole) of propargyl alcohol, and oxygen was bubbled through the reaction mixture for 20 hours. Extraction of the resulting reaction product with ether and subsequent evaporation of the ether gave 10.1 g. of the hexadiynediol, which is a 92% yield.

*Example 5*

This example illustrates the coupling of a monocarboxylic acid ester of an acetylenic alcohol.

A solution of 68.2 g. of t-butylamine (0.94 mole) in 100 ml. of water was adjusted to pH 8.5 with HCl. The amine hydrochloride solution was then mixed with 12.5 g. (0.065 mole) of cuprous chloride and 9.8 g. (0.10 mole) of propargyl acetate, and stirred under a slight positive pressure of oxygen for 20 hours. The resulting reaction mixture, diluted with water to 500 ml., was extracted with 250 ml. of ether for four hours in a continuous liquid-liquid extractor. Concentration of the ether extract precipitated 1.4 g. of 2,4-hexadiyne-1,6-diol, removed by filtration. By distillation of the filtrate, there were recovered 6.7 g. of unreacted propargyl acetate, after which the portion of the filtrate which boiled at about 150° C. was dissolved in alcohol, treated with charcoal, filtered and evaporated, leaving 1.2 g. of 2,4-hexadiyne-1,6-diol diacetate, with physical properties agreeing with the literature data (Armitage and Whiting, J. Chem. Soc. 1952, 2005).

*Example 6*

This example illustrates the coupling of a higher aliphatic monocarboxylic acid ester of an acetylenic alcohol.

Using the procedure of Example 5, 12.5 g. (0.065 mole) of cuprous chloride and 19.6 g. (0.100 mole) of propargyl pelargonate were added to the amine hydrochloride solution of pH 8.5, and the reaction mixture stirred under a slight positive pressure of oxygen for 20 hours. One liter of water was added and the mixture extracted with three 250 ml. portions of ether. The combined extracts were washed with three 100 ml. portions of 10% aqueous HCl and the ether removed by evaporation. Infra-red and ultra-violet spectral analyses showed the 17.5 g. of oily liquid product to be a mixture of propargyl pelargonate and 1,6-hexadiynediol bis-pelargonate, the coupled product representing about 10% of the mixture.

*Example 7*

This example illustrates the coupling of a dicarboxylic acid half-ester of an acetylenic alcohol, using a conventional ammoniacal reaction mixture.

Oxygen was applied to a stirred mixture of 12.5 g. (0.065 mole) of cuprous chloride, 20 g. (0.38 mole) of ammonium chloride, 1.5 g. (0.09 mole) of ammonia (added as ammonium hydroxide in aqueous solution), and 20.4 g. (0.10 mole) of propargyl hydrogen phthalate in 150 ml. of water. After 20 hours, the blue-green solid ammoniacal cuprous chloride complex was filtered off and shaken with 500 ml. of 3 N sulfuric acid and 200 ml. of ether. The ethereal extract was separated and the aqueous acid layer extracted with an additional 100 ml. of ether. Combination and evaporation of the ether extracts produced a solid which was recrystallized from a mixture of water and acetone to give 10.7 g. of 2,4-hexadiyne-1,6-diol di(hydrogen phthalate), M. 145.5–147°. This is a 53% yield of the ester.

*Example 8*

This example illustrates the superior yields obtained by the present process using an amine in the coupling procedure.

To a solution of 68.2 g. (0.94 mole) of t-butyl amine in 100 ml. of water was added sufficient 1:1 HCl to bring the pH to 9. The resulting amine hydrochloride was then mixed with 12.5 g. of cuprous chloride and 20.4 g. (0.1 mole) of propargyl hydrogen phthalate, and the reaction mixture was stirred for 20 hours under a slight positive pressure of oxygen. The aqueous layer was discarded; the solid material in the reaction flask was extracted once with 250 ml. of 3 N sulfuric acid and 250 ml. of ether, and then the remaining solid from this extraction was dissolved in a mixture of 500 ml. of equal volumes of sulfuric acid and ether. The ether layers, after shaking, were removed and combined, and the respective acid layers were each extracted twice with 100 ml. portions of ether, which ether extracts were combined with the previously separated extracts. After evaporation of the total ether solution and recrystallization of the resulting solid from acetone and water, there were obtained 16.7 g. of 2,4-hexadiyne-1,6-diol di(hydrogen phthalate). This is an 82% yield of the coupled half-ester.

2,4-hexadiyne-1,6-diol di(hydrogen phthalate) is a new compound which has useful biological toxicant properties and is claimed in my copending application Ser. No. 549,867, filed November 29, 1955, now U.S. Patent 2,889,356, assigned to the same assignee as the present application.

Using the process of the invention as described above, for example, propargyl carbanilate may be coupled to give 2,4-hexadiyne-1,6-diol dicarbanilate; methyl propargyl ether may be coupled to give 1,6-dimethoxy-2,4-hexadiyne, etc. In operating with esters insoluble in water, it may be preferred to use an organic solvent which is a solvent for the ester. The process may be operated continuously or batchwise. Other modifications and variations of the present process will be obvious to those skilled in the art.

What is claimed is:

1. The process which comprises the oxidative coupling of an acetylenic oxy compound containing an acetylenic hydrogen atom and selected from the class consisting of lower alkynyl alcohols, hydrocarbyl ethers and hydrocarbyl carboxylic acid esters of the said alcohols having not more than 19 carbon atoms in the ether and ester groups, in the presence of cuprous chloride and a hydrocarbyl amine hydrochloride salt having not more than 12 carbon atoms.

2. The process of claim 1, which is carried out at a pH of from 5 to 9.

3. The process of claim 1, which is carried out in a non-polar solvent medium.

4. The process of claim 1, wherein a mixture of a hydrocarbyl amine and a hydrocarbyl amine hydrochloride salt having not more than 12 carbon atoms in each hydrocarbyl group is used.

5. The process of claim 1, wherein said salt is a primary amine salt.

6. The process of claim 1, wherein said salt is a tertiary alkyl primary amine salt.

7. The process of claim 1, wherein said salt is t-butylamine hydrochloride.

8. The process of claim 1, wherein said salt is ethylenediamine hydrochloride.

9. The process which comprises the oxidative coupling of an acetylenic oxy compound containing an acetylenic hydrogen atom and selected from the class consisting of lower alkynyl alcohols, alkyl and aromatic hydrocarbon ethers and carboxylic acid esters of the said alcohols having not more than 19 carbon atoms in the ether and ester groups, in the presence of cuprous chloride and a hydrocarbyl amine hydrochloride salt selected from the class consisting of pyridine and lower alkyl amine hydrochloride salts.

10. The process which comprises the oxidative coupling of a lower alkynyl alcohol containing an acetylenic hydrogen atom, in the presence of cuprous chloride and a lower hydrocarbyl primary amine hydrochloride.

11. The process which comprises the oxidative coupling of a hydrocarbyl ether of a lower alkynyl alcohol containing an acetylenic hydrogen atom and having not more than 19 carbon atoms in the ether group, in the presence of cuprous chloride and a lower hydrocarbyl primary amine hydrochloride.

12. The process which comprises the oxidative coupling of a hydrocarbyl carboxylic acid ester of a lower alkynyl alcohol containing an acetylenic hydrogen atom and having not more than 19 carbon atoms in the ester group, in the presence of cuprous chloride and a lower hydrocarbyl primary amine hydrochloride.

13. The process which comprises the oxidative coupling of a hydrocarbyl carboxylic acid ester of a lower alkynyl alcohol containing an acetylenic hydrogen atom and having not more than 19 carbon atoms in the ester group, in the presence of cuprous chloride and a tertiary lower alkyl primary amine hydrochloride.

14. The process which comprises the oxidation coupling of propargyl alcohol in the presence of cuprous chloride and a hydrocarbyl amine hydrochloride having not more than 12 carbon atoms.

15. The process which comprises the oxidative coupling of propargyl pelargonate in the presence of cuprous chloride and t-butylamine hydrochloride.

16. The process which comprises the oxidative coupling of propargyl acetate in the presence of cuprous chloride and t-butylamine hydrochloride.

17. The process which comprises the oxidative coupling of propargyl hydrogen phthalate in the presence of cuprous chloride and t-butylamine hydrochloride.

18. The process which comprises the oxidative coupling of propargyl alcohol in the presence of cuprous chloride and t-butylamine hydrochloride.

19. The process which comprises the oxidative coupling of propargyl alcohol in the presence of cuprous chloride and ethylenediamine hydrochloride.

References Cited in the file of this patent

UNITED STATES PATENTS

| | | |
|---|---|---|
| 1,926,039 | Downing | Sept. 12, 1933 |
| 2,796,442 | Franke et al. | June 18, 1957 |

OTHER REFERENCES

Chemical Society Journal, 1947, part II, pp. 1579–1583.

Copenhaver et al.: Acetylene and Carbon Monoxide Chemistry, 1949, p. 122.

Piganiol: Acetylene Homologs and Derivatives, 1950, page 73.

Armitage et al.: Chemical Society Journal, 1952, part 2, No. 370, pp. 1998–2005.

Fieser et al.: Organic Chemistry, 1954, 225–227.